United States Patent [19]

Santilli et al.

[11] Patent Number: 4,699,894
[45] Date of Patent: Oct. 13, 1987

[54] HIGHLY ACTIVE AND HIGHLY SELECTIVE AROMATIZATION CATALYST

[75] Inventors: Donald S. Santilli, Novato; John J. Long, Suisun City; Robert T. Lewis, Albany, all of Calif.

[73] Assignee: Chevron Research Company, San Francisco, Calif.

[21] Appl. No.: 724,146

[22] Filed: Apr. 17, 1985

[51] Int. Cl.$^4$ .......................... B01J 29/30; B01J 29/08
[52] U.S. Cl. .......................................... 502/74; 502/66
[58] Field of Search ............................. 502/66, 74, 65; 208/137, 138

[56] References Cited

U.S. PATENT DOCUMENTS

| | | | |
|---|---|---|---|
| 3,197,398 | 7/1965 | Young | 502/66 X |
| 3,346,482 | 10/1967 | Arey, Jr. et al. | 502/74 X |
| 3,413,213 | 11/1968 | Hayes | 208/139 |
| 3,458,592 | 7/1969 | Senn, III et al. | 502/74 X |
| 3,592,760 | 7/1971 | Young | 502/74 X |
| 3,650,990 | 3/1972 | Frilette et al. | 502/74 |
| 4,443,552 | 4/1984 | Iida et al. | 502/74 X |

OTHER PUBLICATIONS

H. Winkler et al., Proton Spin Relaxation in the System NaPtY Zeolite/Water; The State of Platinum, 50 Surface Science 565 (1975).
E. G. Derouane et al., EPR Study of the Nature and Removal of Iron (III) Impurities in Ammonium-Exchange NaY-Zeolite, 33 Journal of Catalysis 169 (1974).
B. D. McNichol et al., Studies of the Deammoniation and Dehydroxylation Processes in NH$_4$ Faujasite and NH$_4$ Mordenite Zeolites, the Use of the ESR of Framework-substituted Fe$^{3+}$ as a Probe, 25 Journal of Catalysis 223 (1972).
B. Wichterlova, Redox Behavior of Fe$^{3+}$ Impurities in Y Zeolites, ESR Study, 1 Zeolites 181 (1981).
J. Novakova et al., Properties of Different Fe (III) Species Introduced into NH$_4$-Y Zeolites, 2 Zeolites 17 (1982).
J. Bart et al., A Spectroscopic Investigation of the Iron Distribution Zeolites Derived from Lipari Pumice, 3 Zeolites 226 (1983).
R. L. Garten, a Mössbauer Spectroscopic Study of the Reversible Oxidation of Ferrous Ions in Y-Zeolite, 18 Journal of Catalysis 90 (1970).
W. N. Delgass et al., Mössbauer a Fact Exchangeable Ferrous Ions in Y-Zeolite in Dowex 50 Resin, 50 Journal of Chemical Physics 4603 (1969).
V. Wichterlova et al., ESR Studies of Fe$^{3+}$-Zeolites, 3 React. Kinet, Catal. Lett. 197 (1980).

Primary Examiner—Carl F. Dees
Attorney, Agent, or Firm—W. K. Turner; E. A. Schaal; P. L. McGarrigle, Jr.

[57] ABSTRACT

A highly selective zeolitic reforming catalyst is disclosed that contains a promoter selected from the group consisting of iron, cobalt, and titanium; and that has a platinum to promoter weight ratio of less than 10:1. In one embodiment a type L zeolite is formed by combining an aqueous solution of potassium hydroxide, aluminum hydroxide, and ferric nitrate with an aqueous solution of silica to form a thickening gel in a mother liquor; heating the thickening gel to form a type L zeolite; cooling the solution containing the type L zeolite; decanting the mother liquor from the solution; filtering the type L zeolite from the solution; washing the filtered type L zeolite so that the pH of the wash is about $10\frac{1}{2}$; and drying the washed type L zeolite. The catalyst is formed by adding platinum to the dried type L zeolite by pore fill impregnation with an aqueous solution of Pt(NH$_3$)$_4$(NO$_3$)$_2$ to form a catalyst; drying the catalyst and calcining the catalyst.

9 Claims, No Drawings

HIGHLY ACTIVE AND HIGHLY SELECTIVE AROMATIZATION CATALYST

BACKGROUND OF THE INVENTION

The present invention concerns a highly active and highly selective aromatization catalyst that contains platinum, a large-pore zeolite, and at least one promoter selected from the group consisting of iron, cobalt, and titanuim.

Catalytic reforming is a well-known process that is used to raise the octane rating of a naphtha. The reactions that occur during reforming include: dehydrogenation of cyclohexanes, dehydroisomerization of alkylcyclopentanes, dehydrocyclization of acyclic hydrocarbons, dealkylation of alkybenzenes, isomerization of paraffins, and hydrocracking of paraffins. The hydrocracking reaction should be suppressed because that reaction lowers the yield of hydrogen and lowers the yield of liquid products.

Reforming catalysts must be selective for dehydrocyclization in order to produce high yields of liquid product and low yields of light gases. These catalysts should possess good activity so that low temperatures can be used in the reformer.

While most reforming catalysts contain platinum on an alumina support, large-pore zeolites have been proposed as catalyst supports. These large-pore zeolites have pores large enough for hydrocarbons in the gasoline boiling range to pass through.

SUMMARY OF THE INVENTION

The present invention is based on the discovery that a highly active and highly selective large-pore zeolite reforming catalyst can be made if the catalyst contains a promoter that is either iron, cobalt, or titanium; and if the catalyst has a platinum to metal mole ratio of less than 10:1.

In one embodiment of the present invention, type L zeolite is formed by combining an aqueous solution of potassium hydroxide, aluminum hydroxide, and ferric nitrate with an aqueous solution of silica to form a thickening gel in a mother liquor; heating the thickening gel to form a type L zeolite; cooling the gel containing the type L zeolite; decanting the mother liquor from the gel; filtering the type L zeolite from the gel; washing the filtered type L zeolite so that the pH of the wash is about 10.5; and drying the washed type L zeolite. The catalyst is formed by adding platinum to the dried type L zeolite by pore fill impregnation with an aqueous solution of $Pt(NH_3)_4(NO_3)_2$ to form a catalyst; drying the catalyst; and calcining the catalyst.

Alternatively, a barium form of the catalyst can be formed by ion exchanging the dried type L zeolite powder prior to platinum impregnation. Barium is added by mixing an aqueous solution of barium nitrate with the zeolite and heating the mixture; filtering the mixture; washing the filtered mixture to remove excess potassium ions; and drying and calcining the mixture.

DESCRIPTION OF THE PREFERRED EMBODIMENTS

In its broadest aspect, the present invention involves the discovery that the presence of a promoter; such as iron, cobalt, or titanium; in a zeolite supported platinum catalyst has a major promotional effect on the aromatization activity of that catalyst. To have a high aromatization activity, the catalyst should have a platinum to promoter metal mole ratio of less than 10:1.

As used in this application, the term "promoter" means "a metal that enhances the dehydrocyclization activity of a catalyst." The function of the promoter is to maintain the high initial activity of the noble metal catalyst. This promoter can be either iron, cobalt, or titanium. A common characteristic of promoter metals is that they all have either d or f valence electrons.

The absolute level of promoter is important for making a highly selective reforming catalyst. With a high ratio of platinum/promoter, the original, highly active, well dispersed, platinum catalyst rapidly loses activity at reforming temperatures. Initial activity is best maintained when the platinum/promoter ratio is about ten or less. On the other hand, it is well known that transition metals promote the undesired hydrocarbon cracking reactions. Therefore, one should avoid excess levels of these metals.

Several methods exist for adding a promoter to a zeolitic reforming catalyst. In a preferred embodiment, the promoter is added during synthesis of the zeolite. In other embodiments, the promoter can be added after synthesis—either by impregnation or by ion exchange. However introduced, the promoter must be in an oxidized state (the metal must have a positive charge) prior to addition of the Group VIII metal.

The dehydrocyclization catalyst according to the invention is a large-pore zeolite charged with one or more dehydrogenating constituents. The term "large-pore zeolite" is defined as a zeolite having an effective pore diameter of 6 to 15 Angstroms.

Among the large-pore crystalline zeolites which have been found to be useful in the practice of the present invention, type L zeolite, zeolite X, zeolite Y and faujasite are the most important and have apparent pore sizes on the order of 7 to 9 Angstroms.

The chemical formula for zeolite Y expressed in terms of mole oxides may be written as:

$$(0.7-1.1)Na_2O:Al_2O_3:xSiO_2:yH_2O$$

wherein x is a value greater than 3 up to about 6 and y may be a value up to about 9. Zeolite Y has a characteristic X-ray powder diffraction pattern which may be employed with the above formula for identification. Zeolite Y is described in more detail in U.S. Pat. No. 3,130,007. U.S. Pat. No. 3,130,007 is hereby incorporated by reference to show a zeolite useful in the present invention.

Zeolite X is a synthetic crystalline zeolitic molecular sieve which may be represented by the formula:

$$(0.7-1.1)M_{2/n}O:Al_2O_3:xSiO_2:yH_2O$$

wherein M represents a metal, particularly alkali and alkaline earth metals, n is the valence of M, x is a value of from 2.0 to 3.0 and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference to show a zeolite useful in the present invention.

The preferred catalyst according to the invention is a type L zeolite charged with one or more dehydrogenating constituents.

Type L zeolites are synthetic zeolites. A theoretical formula is $M_{9/n}[(AlO_2)_9(SiO_2)_{27}]$ in which M is a cation having the valency n.

The real formula may vary without changing the crystalline structure; for example, the mole ratio of silicon to aluminum (Si/Al) may vary from 1.0 to 3.5.

One method of forming the desired catalyst is by first forming a type L zeolite by combining an aqueous solution of potassium hydroxide, aluminum hydroxide, and ferric nitrate with an aqueous solution of silica to form a thickening gel in a mother liquor; heating the thickening gel to form a type L zeolite; cooling the gel containing the type L zeolite; decanting the mother liquor from the gel; filtering the type L zeolite from the gel; washing the filtered type L zeolite so that the pH of the wash is about 10.5; and drying the washed type L zeolite. Then the catalyst is formed by adding platinum to the dried type L zeolite by pore fill impregnation with an aqueous solution of either $Pt(NH_3)_4(NO_3)_2$ or $Pt(NH_3)_4Cl_2$ to form a catalyst; drying the catalyst; and calcining the catalyst.

An inorganic oxide can be used as a binder for the large-pore zeolite. This binder can be either natural, synthetically produced, or a combination of the two. Preferred loadings of inorganic oxide binders are from 5% to 50% of the weight of the catalyst. Useful binders include silica, alumina, aluminosilicates, and clays.

This catalyst can be used to reform a naphtha that is substantially free of sulfur, nitrogen, metals, and other known catalyst poisons. The poisons can be removed first by using conventional hydrofining techniques, then by using sorbents to remove the remaining poisons. Specifically, sulfur should be reduced to below 100 ppb in the feed. The naphtha can be contacted with the catalyst in either a fixed bed system, a moving bed system, a fluidized system, or a batch system. The pressure is from about 1 atmosphere to about 500 psig. The preferred temperature is from about 430° C. to about 550° C. The liquid hourly space velocity (LHSV) is from about 0.1 hr$^{-1}$ to about 10 hr$^{-1}$. Enough hydrogen is used to insure an $H_2$/HC ratio of from 1:1 to about 20:1.

EXAMPLES

The invention will be further illustrated by the following examples which set forth particularly advantageous method and composition embodiments. While the examples are provided to illustrate the present invention, they are not intended to limit it.

EXAMPLE I

Zeolite Preparation

A 90° C. solution was formed containing 102 grams KOH, 200 grams water, 47 grams Al(OH)$_3$, and a prescribed amount either Fe(NO$_3$)$_3$.9H$_2$O or K$_3$Fe(CN)$_6$. This solution was combined with a solution of 600 grams HS-30 Ludox and 240 grams water. After shaking the combined solution in a Teflon bottle for three minutes, the solution became a thickening gel. This thickening gel was heated in an autoclave at 25° F./hr. to 302° F. and held at 302° F. for 72 hours to form a crystalline material. When ferric nitrate was used, an orange-brown precipitate formed before heating, but when potassium ferric cyanide was used, the solution was yellow. However, in each case after crystallization, the zeolite was white and the supernate was colorless. After the solution was cooled, the mother liquor was decanted; the solid was filtered, washed three times in a ten-fold excess of water so that the pH of the wash was about 10.5, and dried. In each case, about 170 grams of zeolite was obtained and all of the added iron had been incorporated in the zeolite. X-ray diffraction measurements showed that all samples were 100% L zeolite. Analyses of the products are given in Table I.

TABLE I

| | Physical Properties of Various L-Zeolite Samples | | | | | |
|---|---|---|---|---|---|---|
| Sample | Wt Fe Compound in Synthesis*, g | SiO$_2$, Wt % | Al$_2$O$_3$, Wt % | K$_2$O, Wt % | Fe, ppm | Ti, ppm |
| 1 | 0.0 | 61.9 | 16.2 | 16.0 | 221 | <42 |
| 2 | 0.93 | 63.2 | 16.3 | 16.2 | 849 | 71 |
| 3 | 1.5 | 63.3 | 16.9 | 17.3 | 1200 | 112 |
| 4 | 2.3 | 63.3 | 16.4 | 16.6 | 2160 | 80 |
| 5 | 1.9 | 63.7 | 16.8 | 17.0 | 1410 | 97 |
| 6 | 9.4 | 62.5 | 15.8 | 16.4 | 10300 | <42 |

*All samples, except 1, 4 & 6, used ferric nitrate. Samples 4 & 6 used potassium ferric cyanide.

It appears that adding small amounts of iron did not affect the synthesis since, save for iron, the elemental analyses, X-ray diffraction data, and scanning electromicrographs showed that all of these materials were alike.

The presence of iron and titanium impurities in the synthesis materials can also result in the incorporation of the active promoter metal in the zeolite support. In another preparation, L zeolite was synthesized by dissolving 127.8 grams KOH in 127.8 grams of water, followed by the addition of 60.2 grams of Al$_2$O$_3$.3H$_2$O. This was boiled until everything dissolved. The solution was cooled to 50° C., diluted with 690.5 grams of water, and mixed. Then, 237.6 grams of Hi-Sil 233 (88% SiO$_2$) was added to the mixture and the mixture was homogenized. When the mixture was heated in an autoclave at 150° C. for about 40 hours, L zeolite was produced. Elemental analysis of the product showed it to contain SiO$_2$=67.4%; Al$_2$O$_3$=17.2%; K$_2$O=17.6%; Fe=1300 ppm; Ti=520 ppm (all concentrations are on a weight basis).

Catalyst Preparation

Platinum was added to the type L zeolite by pore fill impregnation with an aqueous solution of Pt(NH$_3$)$_4$(NO$_3$)$_2$. After sitting for two hours in a closed bottle, the material was dried at 250° F. for 16 hours and was calcined at 500° F. for three hours.

Catalyst Testing

The platinum-type L zeolite catalysts were tested for aromatization activity by loading the catalysts (as 24 to 80 mesh granules) in the middle of a ¼-inch stainless steel reactor. The catalyst sample was surrounded by alundum. The catalyst was reduced in one atmosphere hydrogen (400–500 ml/minute) and heated to operating temperature with 30- and 10-minute stops at 400° and 700° F., respectively. The operating conditions were a temperature of 920° F., a pressure of 100 psig, and an H$_2$/HC ratio of 6:1. The amount of catalyst used and the space velocity were adjusted so that the ratio of feed rate to loaded platinum was kept constant (e.g., one gram of a 1% platinum-type L zeolite would be compared to 0.5 grams of a 2% platinum-type L zeolite at the same feed rate).

The catalysts were tested with a C$_6$-C$_7$ naphtha since these light hydrocarbons are difficult to aromatize with conventional reforming catalysts. This feed consisted of 80 v % paraffins, 16.2 v % naphthenes, and 3.5 v % aromatics. The boiling range (D86 distillation) for the naphtha feedstock was 145° F. initial point, 170° F. at 10% distilled, 180° F. at 30% distilled, 192° F. at 50% distilled, 218° F. at 80% distilled, 233° F. at 90% distilled and 277° F. at end point. The results, taken after 20 hours on stream, are given in Table II.

TABLE II

Results of Reactor Tests for Various Pt-K-L Catalysts Using a $C_6$-$C_7$ Arabian Feed

| Atom Ratio Pt/(Fe + Ti) | Conversion ($C_4^-$ Products and Aromatics) Wt. Percent | Selectivity (Wt. Percent Aromatics/ Conversion) |
|---|---|---|
| 0.03 | 82 | 80 |
| 0.2 | 80 | 80 |
| 1 | 75 | 82 |
| 5 | 65 | 80 |
| 10 | 50 | 78 |

The data in Table II show that the platinum to promoter metal mole ratio should be below 10:1 in order to have a conversion of more than 50%.

EXAMPLE II

A series of catalysts was prepared wherein the principal promoter metal was other than iron. The same L-zeolite synthesis described in samples 1 through 6 of Example I was used and in each case the promoter metal was introduced as the nitrate salt. Platinum was added in the manner described previously to the level of 0.8 wt. %. Catalyst testing was carried out in the same way as in Example I. The levels of promoter metals in each catalyst and the corresponding catalytic test results are shown in Table III. A common characteristic of each of the promoter metals which was found to be effective was the presence of d or f valence electrons.

TABLE III

Properties and Performance Results for Aromatization Catalysts Containing Various Promoter Metals

| Catalyst | Concentration of Promoter, ppm | | | Pt/ Promoter Atom Ratio | Conversion wt % | Selectivity wt % |
|---|---|---|---|---|---|---|
| | Fe | Ti | Co | | | |
| A | 221 | <42 | <35 | 10.0 | 50 | 78 |
| B | 168 | 74 | 1230 | 1.6 | 76 | 82 |
| C | 196 | 1960 | <110 | 1.1 | 71 | 81 |
| D | 1410 | 97 | <112 | 1.5 | 75 | 82 |

EXAMPLE IV

The function of the promoter is to maintain the high initial activity of the noble metal catalyst. With a high ratio of platinum/promoter, the original, highly active, well dispersed, platinum catalyst rapidly loses activity at reforming temperatures. Initial activity is best maintained when the platinum/promoter ratio is about ten or less. This is illustrated by the results of the dehydrocyclization tests shown in Table IV. In this test the feed was normal hexane, the pressure was one atmosphere, the temperature was 820° F., and the hydrogen/hydrocarbon ratio was 6. All of the catalysts consisted of L zeolite loaded with 0.8 wt. % platinum and the indicated level of promoter. The L zeolite supports for these catalysts were made as described in Example I with various amounts of nitrate salts added to the synthesis.

TABLE IV

Activities of Various Aromatization Catalysts As a Function of Time on Stream

| Catalyst | Promoter Concentration | | | Pt/ Promoter Atom Ratio | Time on Stream, min. | Benzene wt % of Feed |
|---|---|---|---|---|---|---|
| | Fe | Ti | Co | | | |
| A | 221 | <42 | <35 | 10 | 1 | 38 |
| | | | | | 43 | 14 |
| F | 1300 | 76 | <101 | 1.6 | 1 | 44 |
| | | | | | 40 | 38 |
| G | 193 | <42 | 1230 | 1.6 | 1 | 44 |
| | | | | | 33 | 39 |
| | | | | | 73 | 38 |
| H | 196 | 1900 | <110 | 1.0 | 1 | 52 |
| | | | | | 36 | 33 |

While the present invention has been described with reference to specific embodiments, this application is intended to cover those changes which may be made by those skilled in the art without departing from the spirit and scope of the appended claims.

What is claimed is:

1. A reforming catalyst comprising a large-pore zeolite containing platinum metal and at least one promoter metal selected from the group consisting of iron, cobalt, and titanium, wherein said catalyst has a platinum to promoter metal mole ratio of less than 10:1.

2. A reforming catalyst according to claim 1 wherein said promoter metal is iron.

3. A reforming catalyst according to claim 1 wherein said large-pore zeolite is selected from the group consisting of zeolite X, zeolite Y, and zeolite L.

4. A reforming catalyst according to claim 3 wherein said large-pore zeolite is zeolite L.

5. A method of preparing the reforming catalyst of claim 4, comprising steps of:
    (a) forming an aqueous solution of alkali hydroxide, aluminum hydroxide, and ferric salt;
    (b) combining said solution with an aqueous solution of silica to form a thickening gel in a mother liquor;
    (c) heating said thickening gel to form an L zeolite;
    (d) cooling said gel containing said L zeolite;
    (e) decanting the mother liquor from said gel;
    (f) filtering said L zeolite from said gel;
    (g) washing said filtered L zeolite;
    (h) drying said washed L zeolite;
    (i) adding platinum to said dried L zeolite to form a catalyst;
    (j) drying said catalyst; and
    (k) calcining said dried catalyst.

6. A method according to claim 5:
    (1) wherein, in step (a), said alkali hydroxide is potassium hydroxide and said ferric salt is ferric nitrate;
    (2) wherein, in step (g), the filtered L zeolite is washed so that the pH of the wash is about 10½; and
    (3) wherein, in step (i), the platinum is added to said dried L zeolite by pore fill impregnation.

7. A method according to claim 5 wherein, in step (i), the platinum is added to said dried L zeolite by pore fill impregnation with an aqueous solution of either $Pt(NH_3)_4(NO_3)_2$ or $Pt(NH_3)_4Cl_2$.

8. A method of preparing the reforming catalyst of claim 4, comprising the steps of:
    (a) forming an aqueous solution of potassium hydroxide, aluminum hydroxide, and ferric nitrate;
    (b) combining said solution with an aqueous solution of silica for form a thickening gel in the mother liquor;

(c) heating said thickening gel in an autoclave at about 302° F. for about 72 hours to form an L zeolite;

(d) cooling said gel containg said L zeolite;

(e) decanting the mother liquor from said gel;

(f) filtering said L zeolite from said gel;

(g) washing said filtered L zeolite three times in a ten-fold excess of water so that the pH of the wash was about 10.5;

(h) drying said washed L zeolite;

(i) adding platinum to said dried L zeolite by pore fill impregnation with an aqueous solution of $Pt(NH_3)_4(NO_3)_2$ to form a catalyst;

(j) drying said catalyst at about 250° F. for 16 hours;

(k) calcining said dried catalyst at about 500° F. for three hours.

9. A reforming catalyst comprising a large pore zeolite containing platinum metal and at least one promoter metal selected from the group consisting of iron, cobalt and titanium wherein said catalyst has a platinum to promoter metal mole ratio of less than 10:1 and the promoter cation is present on the large pore zeolite prior to the reduction of platinum to a zero valence state.

* * * * *